(12) United States Patent
Miyata

(10) Patent No.: US 8,638,472 B2
(45) Date of Patent: Jan. 28, 2014

(54) IMAGE PROCESSING DEVICE AND COMPUTER READABLE MEDIUM

(75) Inventor: Yuji Miyata, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 270 days.

(21) Appl. No.: 12/859,954

(22) Filed: Aug. 20, 2010

(65) Prior Publication Data

US 2011/0051159 A1 Mar. 3, 2011

(30) Foreign Application Priority Data

Aug. 27, 2009 (JP) ................................ 2009-196992

(51) Int. Cl.
*H04N 1/60* (2006.01)
*G06K 15/00* (2006.01)
*H04N 1/40* (2006.01)
*G03F 3/08* (2006.01)

(52) U.S. Cl.
USPC .............................. 358/1.9; 358/2.1; 358/518

(58) Field of Classification Search
USPC .......................................................... 358/1.9
See application file for complete search history.

(56) References Cited

U.S. PATENT DOCUMENTS

| 6,348,977 B1* | 2/2002 | Ooki | 358/1.9 |
| 2004/0257621 A1 | 12/2004 | Ishihara | |
| 2005/0280865 A1* | 12/2005 | Oteki | 358/2.1 |
| 2007/0236758 A1* | 10/2007 | Ariga | 358/518 |

FOREIGN PATENT DOCUMENTS

| JP | 07143345 | 6/1995 |
| JP | 09018732 | 1/1997 |
| JP | 9277606 A | 10/1997 |
| JP | 2001138578 | 5/2001 |
| JP | 2004-320141 | 11/2004 |
| JP | 2005244773 | 9/2005 |
| JP | 2005348170 A | 12/2005 |
| JP | 2006352755 | 12/2006 |
| JP | 2008-028883 | 2/2008 |

OTHER PUBLICATIONS

Notification of Reasons for Refusal for Japanese application No. 2009-196992 mailed May 17, 2011.

* cited by examiner

*Primary Examiner* — Twyler Haskins
*Assistant Examiner* — Henok Shiferaw
(74) *Attorney, Agent, or Firm* — Banner & Witcoff, Ltd.

(57) ABSTRACT

A color space converting section of an image processing device waits to output when acquiring partial data including gray prior to partial data including a chromatic color. After starting to wait, when acquiring partial data including a chromatic color, the converting section outputs multi-color converted data as the converted data expressing gray by a combination of densities of the multiple colors with respect to the partial data its output has been waited. While, when the acquisition of the image data was completed without acquiring any partial data including a chromatic color, the converting section outputs a single black color converted data as the converted data expressing gray by a density of a single color black with respect to the partial data its output has been waited. When acquiring partial data including a chromatic color, then the converting section converts partial data acquired thereafter into the multi-color converted data.

10 Claims, 10 Drawing Sheets

IMAGE PROCESSING DEVICE AND COMPUTER READABLE MEDIUM

CROSS REFERENCE TO RELATED APPLICATION

This application claims priority from Japanese Patent Application No. 2009-196992 filed on Aug. 27, 2009. The entire content of this priority application is incorporated herein by reference.

TECHNICAL FIELD

The present disclosure relates to an image processing device and a computer readable medium, and more particularly to a technology for converting a color space of image data.

BACKGROUND

When, for example, converting a color space of image data into a CMYK color space, expressing gray (gray color) by a combination of densities of four colors CMYK allows the gradation continuity between gray and a chromatic color to be maintained. On the other hand, expressing gray by a density of a single color K (black) allows gray to be simply and clearly expressed.

And also, an expressing method has also been well-known for confirming whether or not the image data includes a pixel showing a chromatic color, and if so, expressing all the gray colors in the image data by the combination of densities of the four colors CMYK, and if not, expressing the gray colors by densities of a single color K. This method provides unified gray colors in the image data all in a decided expression, when whether the gray is expressed by the combination of densities of the four colors CMYK or by a density of a single color K is decided.

SUMMARY

However, the method for unifying the ways to express gray whether by the combination of densities of the four colors CMYK or by a density of the single color K begins with confirmation whether or not a chromatic color is included in the image data, before starting conversion. The confirmation takes time, and therefore, it has been a problem that a long time is required for converted data to be output.

The present invention has been made on the basis of the above circumstances, and the image processing device in the present invention comprises an acquisition section for sequentially acquiring image data expressed by a first color space for each partial data and a color space converting section for converting a color space of partial data acquired by the acquisition section into a second color space, that is different from the first color space, and converting gray in the partial data into the second color space that is expressible by both a density of a single color black and a combination of densities of multiple colors, then outputting a converted data. The color space converting section waits to output when acquired partial data including gray prior to partial data including a chromatic color. After starting to wait to output, when acquired partial data including a chromatic color, the color space converting section outputs multi-color converted data as the converted data expressing gray by the combination of densities of the multiple colors with respect to the partial data its output has been waited. On the other hand, after starting to wait to output, when the acquisition of the image data was completed without acquiring any partial data including a chromatic color, the color space converting section outputs single black color converted data as the converted data expressing gray by a density of a single color black with respect to the partial data its output has been waited. When acquired partial data including a chromatic color, the color space converting section then converts partial data acquired thereafter into the multi-color converted data, and then outputs.

According to the present invention, when partial data including gray is acquired prior to partial data including a chromatic color, whether gray should be expressed by the density of a single color black or by the combination of densities of multiple colors cannot be decided, and therefore the operation waits until whether a chromatic color is included or not is confirmed. However, the present invention outputs converted data without waiting for the confirmation on whether or not a chromatic color is included in the image data, with respect to the partial data acquired prior to the input of the partial data including gray. Therefore, the present invention can output converted data at an earlier stage in comparison with the case to wait to convert until the confirmation on whether a chromatic color is included in the image data or not is made.

BRIEF DESCRIPTION OF THE DRAWINGS

Illustrative aspects in accordance with the invention will be described in detail with reference to the following figures wherein.

DETAILED DESCRIPTION

<Aspect 1>

Aspect 1 of the present invention is explained in reference to FIGS. 1 to 10.

(1) Structure of Printing System

Figure 1:
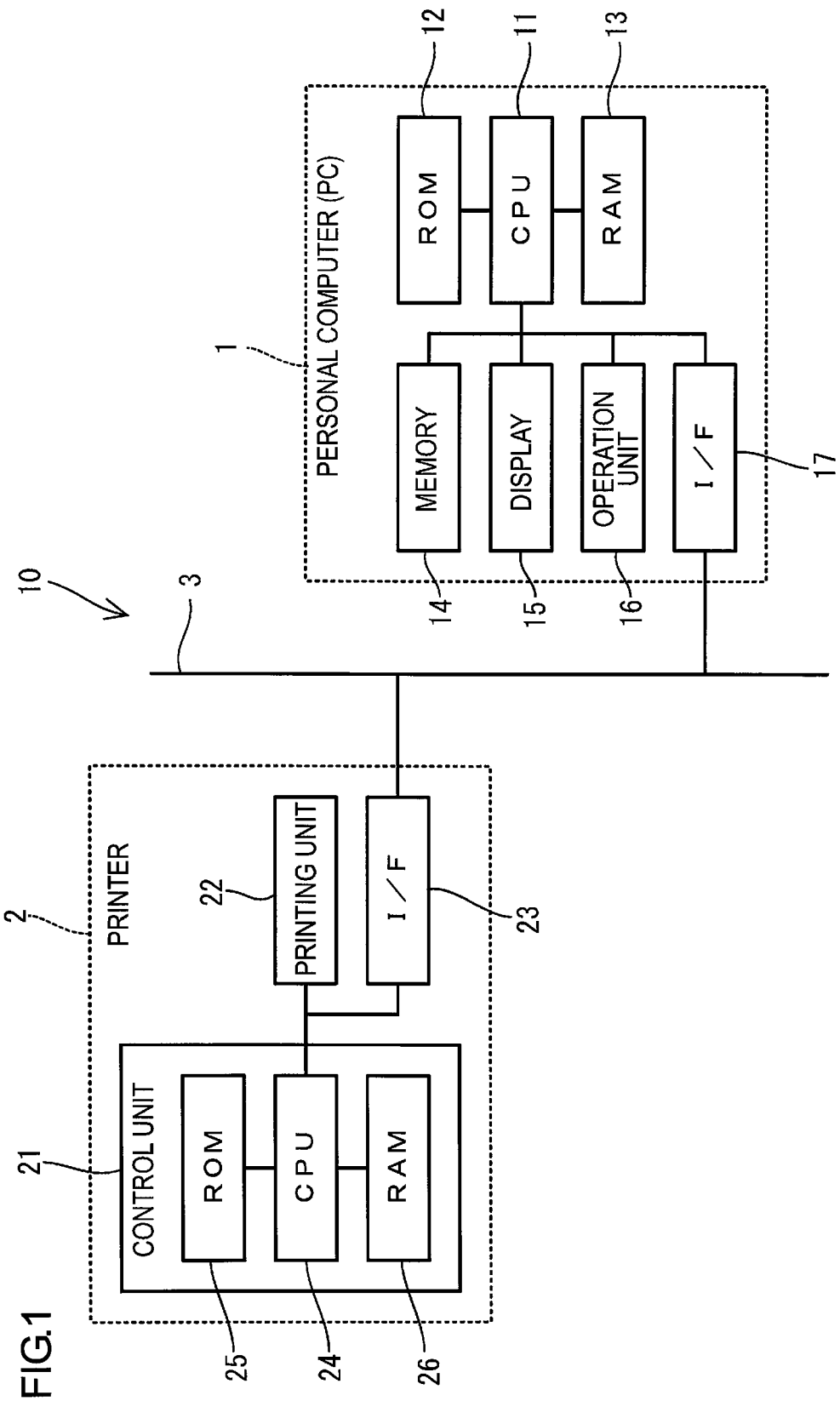
FIG. 1 is a pattern diagram showing a structure of a printing system according to one aspect of the present invention.

FIG. 1 is a pattern diagram showing a structure of a printing system 10. The printing system 10 is constituted by a personal computer 1 (one example of an image processing device: hereinafter referred to as "PC"), a printer 2, and a network such as LAN 3 (Local Area Network) for communicatively connecting the PC 1 and the printer 2.

(1-1) Electrical Configuration of Printer

The printer 2 includes such as a control unit 21, a printing unit 22, and a network interface (I/F) 23.

The control unit 21 includes such as a CPU 24, ROM 25, and a RAM 26. The CPU 24 controls each unit in the printer 2 by executing various kinds of programs stored in the ROM 25. The ROM 25 stores various kinds of programs and data for execution of the CPU 24. The RAM 26 is used as a main storage device for the CPU 24 for executing various kinds of processing.

The printing unit 22 forms a color image by a laser method or an LED method on a recording medium, such as paper, with toners of four colors: C (cyan), M (magenta), Y (yellow), and K (black). Additionally, the printing unit 22 may form a color image by an ink-jet method. The network interface (I/F) 23 is connected with an external device such as a PC 1 through a network.

(1-2) Electrical Configuration of PC 1

The PC 1 includes such as: a CPU 11, a ROM 12, a RAM 13, a memory 14, a display 15, an operation unit 16, and a network interface (I/F) 17.

The CPU 11 (one example of an acquisition section and a color space converting section) controls each unit by executing various kinds of programs stored in the ROM 12. The ROM 12 stores various kinds of programs and data for execution of the CPU 11. The RAM 13 (one example of a storage device) is used as a main storage device for the CPU 11 for executing various kinds of processing.

The memory 14 is an external storage device which stores various kinds of programs and data by using a nonvolatile storage medium such as a hard disk and a flash memory. The memory 14 stores a printer driver (one example of an image processing program) for the printer 2.

The display 15 includes a display device such as a CRT and a liquid crystal display. The operation unit 16 includes such as a mouse and a keyboard. The network interface (I/F) is connected with an external device such as the printer 2 through a network.

(2) General Flow of Printing Processing

Figure 2:
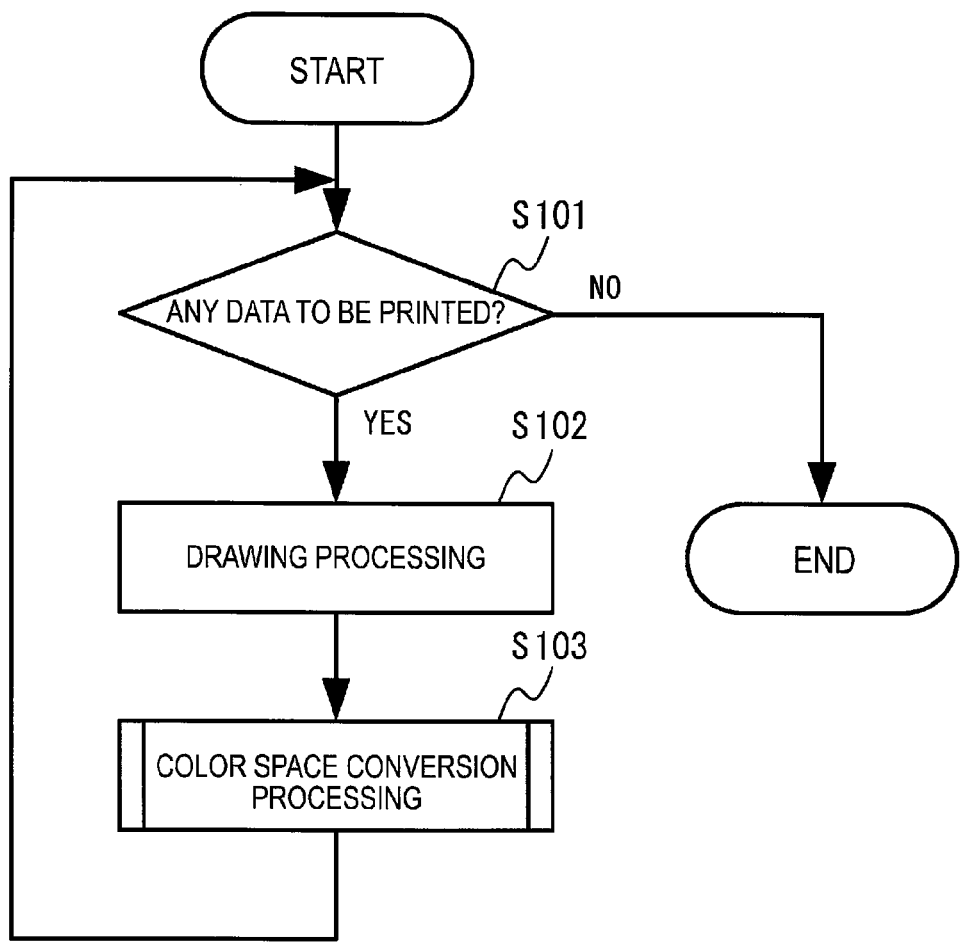
FIG. 2 is a flow chart showing a printing processing flow executed by an image processing device.

FIG. 2 is a flow chart showing a general flow of printing processing executed by the PC 1. An user's instruction of printing via, for example, an application program such as a word processor executed on the PC 1 starts the present processing. When printing is instructed, the CPU 11 executes a printer driver (one example of an a computer program product) for the printing processing shown in the following. The PC 1 is provided with the printer driver by means of a CD-ROM (one example of a computer readable medium) which stores the printer driver thereon.

In the S101, the CPU 11 firstly confirms whether there is data to be printed or not. If not, the CPU 11 ends the processing. Right after the start of the present processing, there is the data to be printed, and the process therefore proceeds to the S102.

In the S102, the CPU 11 executes drawing processing to the data to be printed. The drawing processing produces image data (for example, in bit map format) expressed by an RGB color space (one example of a first color space) in a prescribed unit from the data to be printed, and stores the produced image data in the RAM 13. The above-mentioned prescribed unit may be an unit (page unit) to be printed on one recording medium, or a block unit further dividing the page unit.

In the S103, the CPU 11 executes "color space conversion processing" to the image data stored in the RAM 13. The color space conversion processing converts the image data for each line (one example of partial data) from an RGM color space into a CMYK color space (one example of a second color space), and converts the image data (converted data) converted into the CMYK color space for one line into a page description language (a command), and then sends (outputs) the language to the printer 2.

This is the general flow of the printing processing in the PC 1 side. When receiving the command (the converted data that has been converted into a page description language) from the PC 1, the printer 2 interprets the received command and then prints an image on a recording medium.

(3) Color Space Conversion Processing

FIGS. 3 to 6 show pattern diagrams for explaining the concept of the above-mentioned color space conversion processing. In the color space conversion processing according to the present aspect, when a chromatic color is included in image data, all the gray colors included in the image data are expressed by the combination of densities of four colors CMYK. When a chromatic color is not included in the image data, all the gray colors included in the image data are expressed by a density of a single color K among CMYK.

Figure 3:
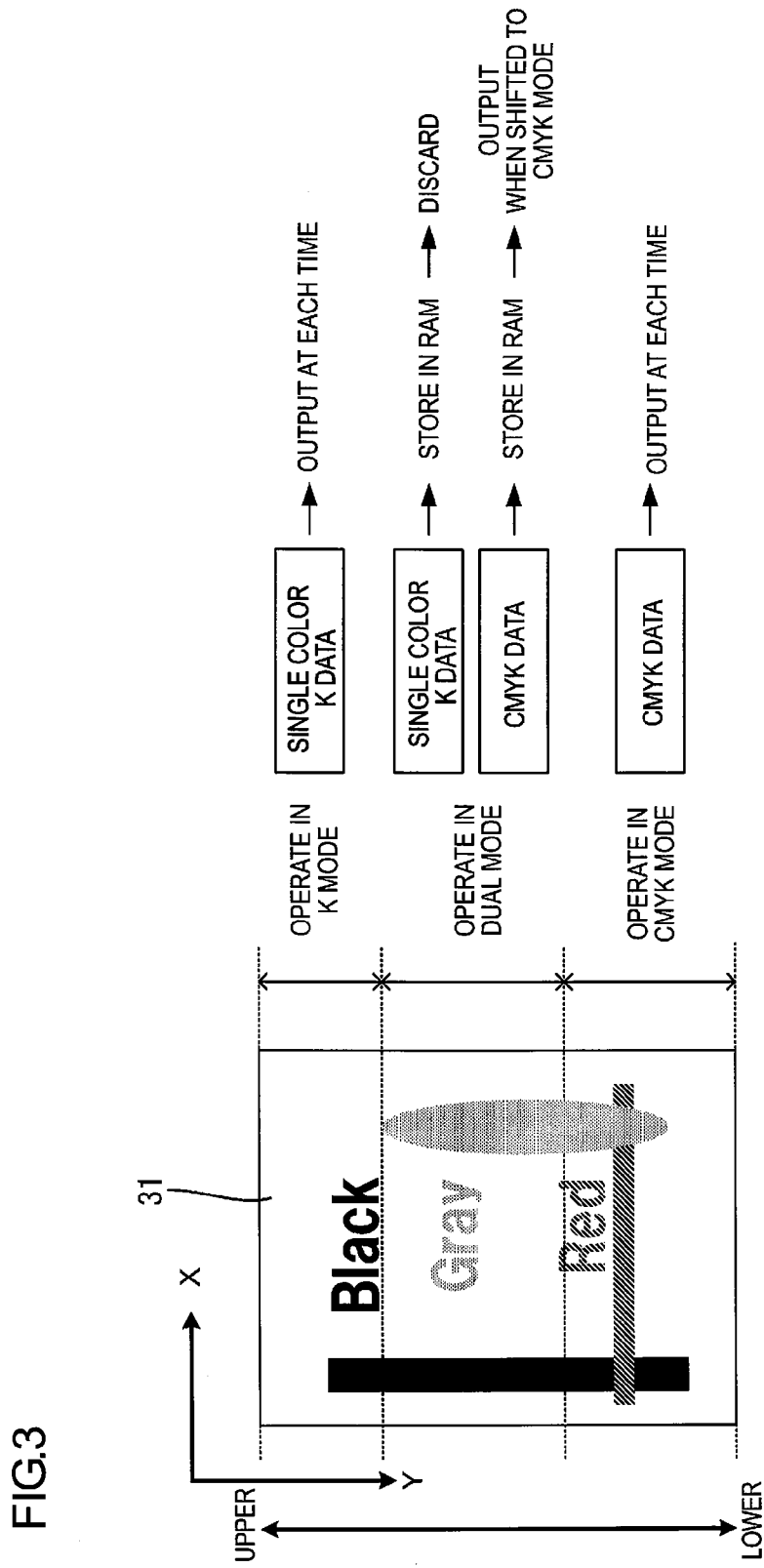
FIG. 3 is a pattern diagram for explaining a concept of a color space conversion processing.

FIG. 3 shows image data 31 composed of white, black, gray, and red. In FIG. 3, with the data to be firstly processed in the drawing processing shown in the upper level and the data to be lastly processed shown in the lower level, the image data 31 is read out (acquired) line by line from the RAM 13 sequentially from the upper level to the lower level. By acquiring sequentially from the upper level to the lower level, a line composed only of white (hereinafter referred to as "white line") in the image data 31 is input firstly, and thereafter, a line composed of white and black (hereinafter referred to as "black line"), a line composed of white, black, and gray (hereinafter referred to as "gray line"), and then a line composed of white, black, gray, and red (hereinafter referred to as "red line") are acquired sequentially. Here, red is one example of a chromatic color.

Every time when acquiring a white line or a black line, the CPU 11 converts the acquired line into a single color K data (one example of a single black color converted data), then outputs the converted data to the printer 2. Here, the single color K data is the converted data obtained by expressing each pixel by a density of a single color black in a CMYK color space, in which gray is also expressed by the density of the single color K.

Every time when acquiring a gray line, the CPU 11 waits to output the converted data, and converts each acquired line into both the single color K data and the CMYK data (one example of multi-color converted data), and then stores the converted data in the RAM 13. Here, the CMYK data is the converted data obtained by expressing each pixel by the combination of densities of four colors CMYK in a CMYK color space, in which gray (gray color) is also expressed by the combination of densities of four colors.

The reason for waiting to output the converted data when acquiring the gray line is because, since whether a line including a chromatic color is to be acquired thereafter or not is unclear at this moment, a choice of which of the single color K data or the CMYK data is output cannot be made.

Then, when acquiring a red line, that a chromatic color is included in the image data is determined at the moment, and the CPU 11 discards the single color K data among the converted data stored in the RAM 13, then immediately outputs the CMYK data. After that, with respect to the lines after the red line, the CPU 11 converts every line acquired line by line into CMYK data, and outputs the converted data at each time. Therefore, in the example shown in FIG. 3, the lines to be acquired before the gray line are output as the single color K data, while the lines to be acquired after the gray line are output as the CMYK data.

Figure 4:
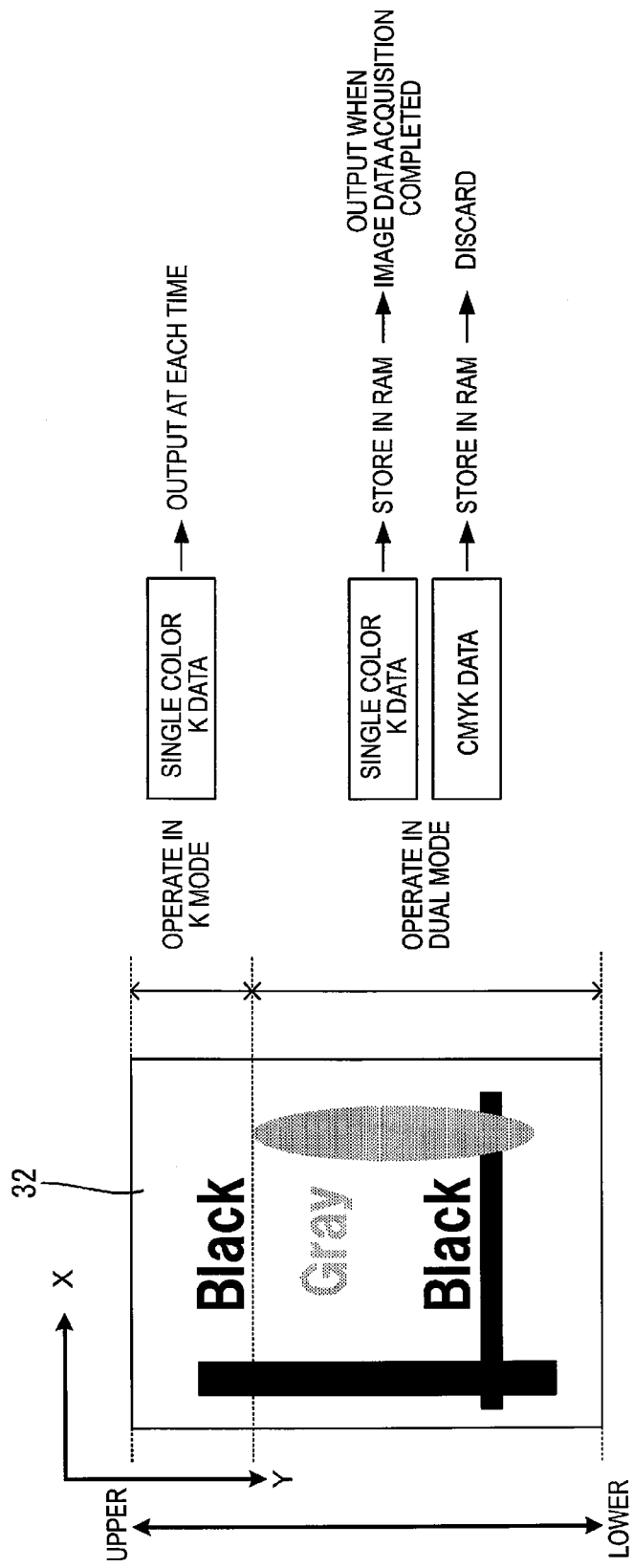
FIG. 4 is a pattern diagram for explaining a concept of a color space conversion processing.

FIG. 4 shows image data 32 in which black is included instead of red in the image data 31 shown in FIG. 3. Accordingly, every time the white line and the black line are firstly converted into the single color K data, the converted data is output to the printer 2. After that, the gray line is converted into both the single color K data and the CMYK data at each time, and stored in the RAM 13. The image data 32 does not include a chromatic color, and thus the image data acquisition is ended without acquiring a line including a chromatic color. When the image data acquisition is ended without acquiring a line including a chromatic color, the CPU 11 discards the CMYK data among the converted data stored in the RAM 13 and outputs the single color K data. Accordingly, in the example shown in FIG. 4, only the single color K data is output.

Figure 5:
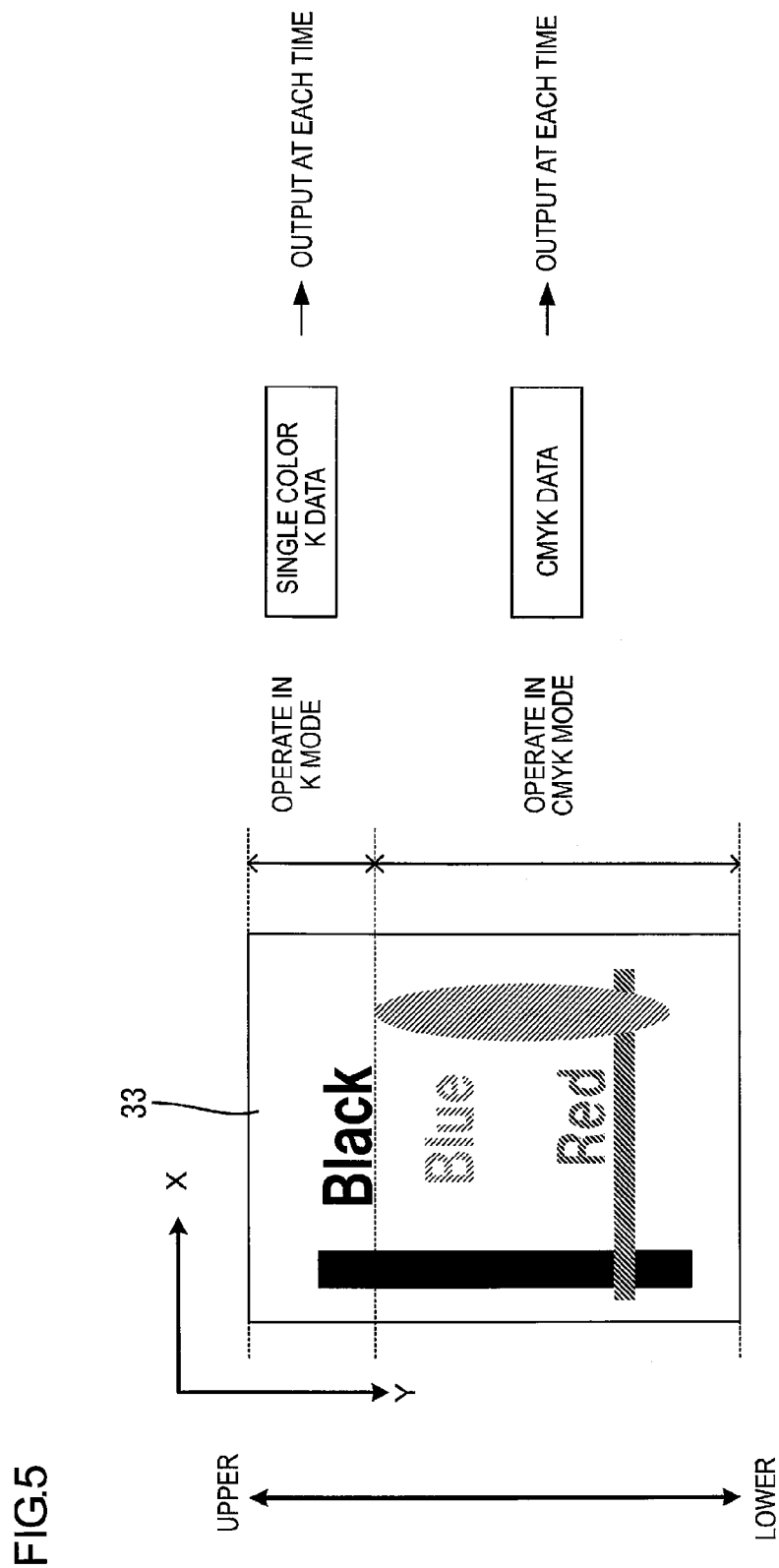
FIG. 5 is a pattern diagram for explaining a concept of a color space conversion processing.

FIG. 5 shows image data 33 in which blue is included instead of gray in the image data 31 shown in FIG. 3. Here, blue is one example of a chromatic color. In this case, every time one line is acquired, the line is converted into the single color K data and output at each time, until a blue line is acquired. After a blue line was acquired, one line is acquired and converted into the CMYK data then output at each time.

Therefore, in the example shown in FIG. 5, the lines to be acquired before the blue line are output as the single color K data, while the lines to be acquired after the blue line are output as the CMYK data. In addition, in the example shown in FIG. 5, the image data 33 does not include gray, and the time for waiting to output the converted data does not therefore occur.

Figure 6:
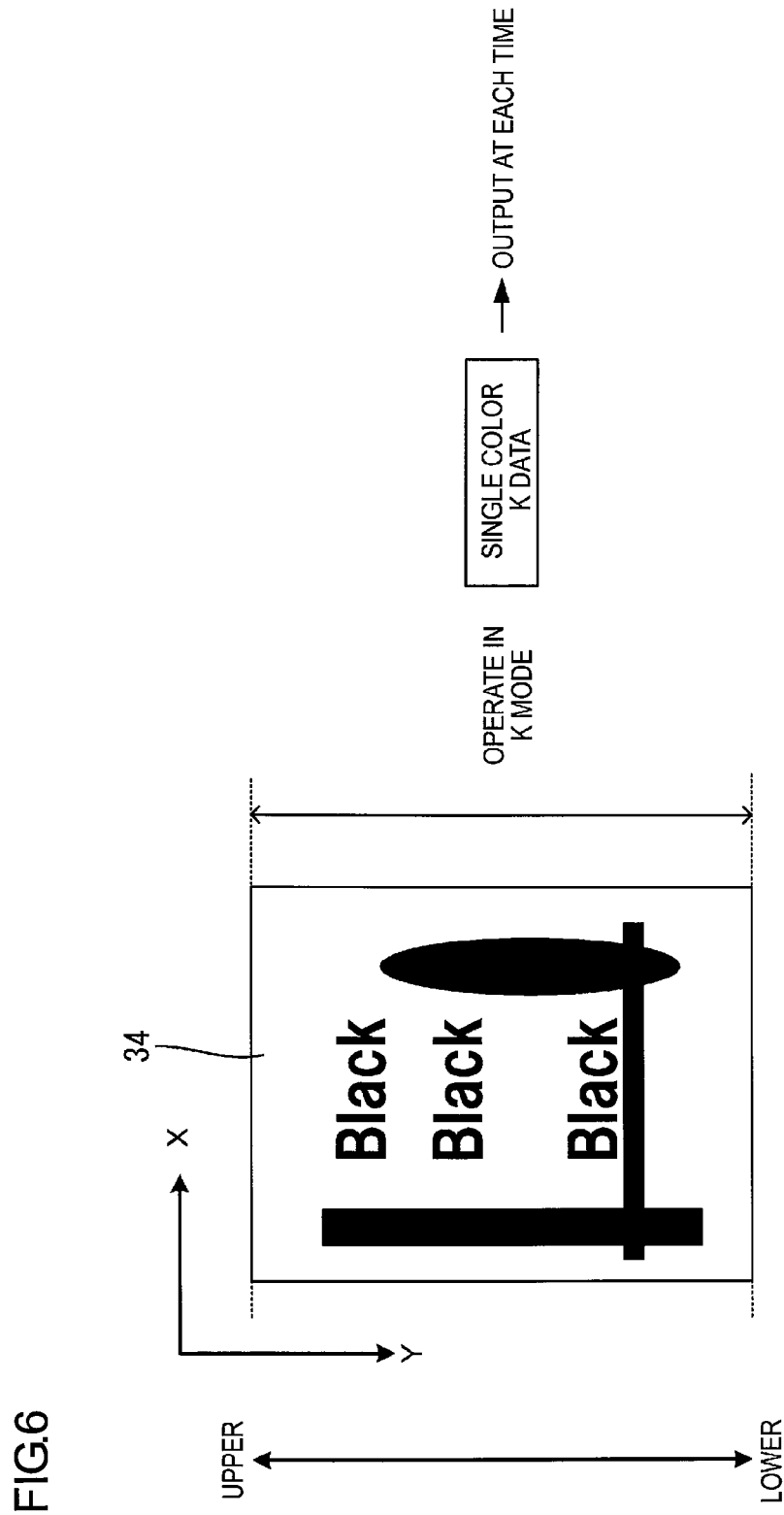
FIG. 6 is a pattern diagram for explaining a concept of a color space conversion processing.

FIG. 6 shows image data 34 in which black is included instead of gray and red in the image data 31 shown in FIG. 3. With no gray line input, all the lines are converted into the single color K data and output to the printer 2 at each time. Also in this case, only the single color K data is output, and the time for waiting to output the converted data does not therefore occur.

(3-1) General Flow of Color Space Conversion Processing (First Half)

Figure 7:
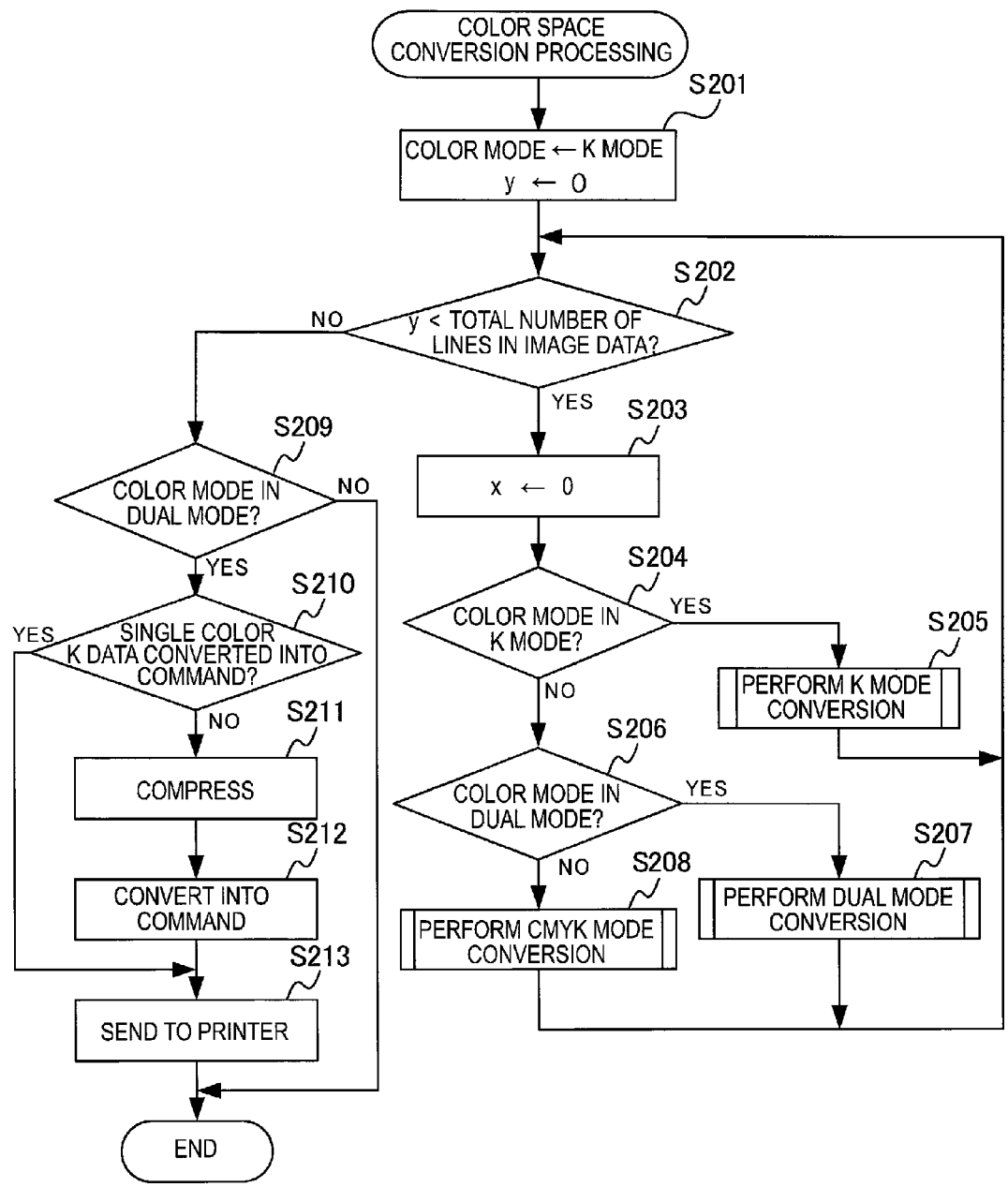
FIG. 7 is a flow chart showing a general flow of a color space conversion processing.

FIG. 7 is a flow chart showing a general flow of the above-mentioned color space conversion processing. Here, the first half of the color space conversion processing shown in FIGS. 7 (S210 to S208) is explained.

In S201, the CPU 11 firstly performs initialization. In the initialization, the CPU 11 sets the color mode to the K mode, and substitutes zero to a variable y indicating the Y coordinate of an acquired line. The Y coordinate is in a coordinate system on the image data, while the variable y is a variable showing a line of the image data. Additionally, the variable indicates the first line (FIG. 3).

Here, the color mode is a motion mode of the CPU 11 when converting the image data into a CMYK color space, and there are a K mode, a dual mode, and a CMYK mode. The K mode acquires the image data for one line including only white, only black, or only both of them, and converts the data into the single color K data at each time, and then outputs the converted data. In the dual mode, when a line including gray is acquired before a line including a chromatic color is acquired, the output of the converted data is waited, and a line acquired after starting to wait the output is converted into both the single color K data and the CMYK data and stored in the RAM 13. In the CMYK mode, after acquiring a line including a chromatic color, every time when the image data for one line is acquired, it is converted into the CMYK data and output.

In S202, the CPU 11 compares the variable y and the number of total lines of the image data, so as to decide whether the conversion of all the lines of the image data has completed or not. The number of total lines of the image data can be known previously from the processing result of the above-mentioned drawing processing. Specifically, the number can be previously known from such as a pixel number included in the header of the image data, a printing resolution set by an user at the time of instructing printing, and a size of the recording medium. When the variable y is smaller than the number of total lines, the CPU 11 decides that the conversion has not yet completed, then proceeds to S203. When the variable y is equal to the number of total lines, the CPU 11 decides that the conversion has completed, and then proceeds to S209.

In S203, the CPU 11 substitutes zero to the variable x indicating the X coordinate of a pixel. The X coordinate is in a coordinate system on the image data, while the variable x is a variable showing a width of the image data. Additionally, the variable x=0 indicates the first pixel in one line (FIG. 3). In S204, the CPU 11 decides whether the color mode is in the K mode or not. The K mode has been set by the initialization right after the start of the present processing, thus the K mode is always decided at first. When the color mode is in the K mode, the CPU 11 proceeds to S205, and if in the other modes, proceeds to S206.

In S205, the CPU 11 executes "K mode conversion". In S206, the CPU 11 decides whether the color mode is in the dual mode or not. When the color mode is in the dual mode, the CPU 11 proceeds to S207, and if in the other mode (in short, in the CMYK mode), proceeds to S208.

In S207, the CPU 11 executes "dual mode conversion". In S208, the CPU 11 executes "CMYK conversion".

(3-2) K Mode Conversion

Figure 8:
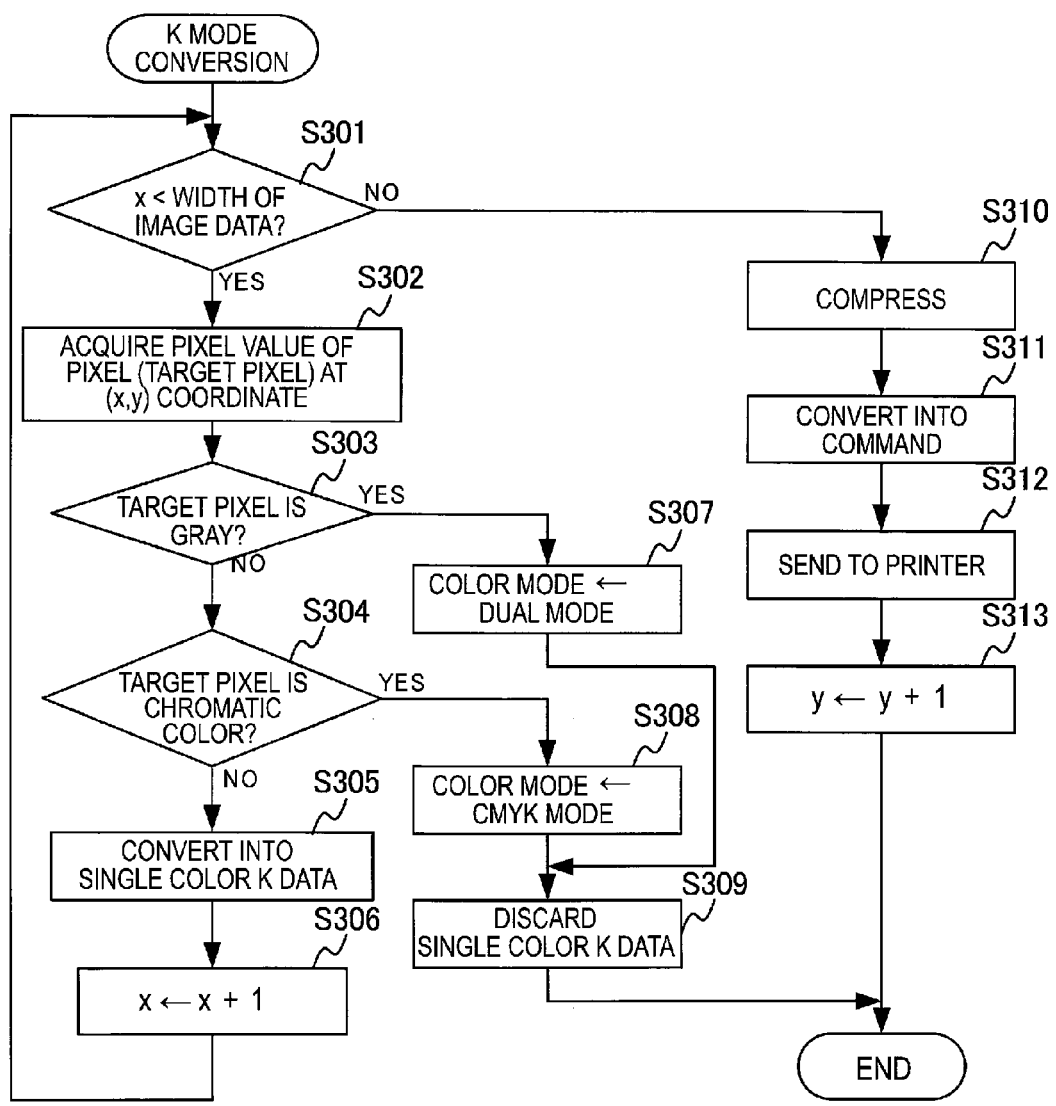
FIG. 8 is a flow chart showing a processing flow of K mode conversion.

FIG. 8 is a flow chart showing a processing flow of the K mode conversion. In S301, the CPU 11 decides whether the conversion for one line has completed or not. When the variable x is smaller than the width of the image, the CPU 11 decides that the conversion for one line has not yet completed and proceeds to S302. When the variable x is equal to the width of the image, the CPU 11 decides that the conversion has completed and proceeds to S310. The width of the image of the image data, like the number of total lines of the image data, can be previously known from a result of the above-mentioned drawing processing.

In S302, the CPU 11 acquires a pixel value (a value of each RGB element) of a pixel (hereinafter, referred to as "target pixel") of the coordinate (variable x, variable y) from a line to be processed. In S303, the CPU 11 decides whether the color of the target pixel is gray or not, based on an acquired pixel value. With the gradation of each RGB element from 0 to 255, and when all the values of each RGB element are 0, the color the pixel shows is black. When all the values are 255, the pixel shows white. When each RGB element has the same value, and moreover, the value is neither 0 nor 255, the pixel shows gray. When the color of the target pixel is other than gray (white, black, and a chromatic color), the CPU 11 proceeds to S304. When the color is gray, the CPU 11 decides that a line including gray (gray color) was acquired before a line including a chromatic color, and proceeds to S307.

In S304, the CPU 11 decides whether or not the color of the target pixel is a chromatic color (color other than white, black, and gray). When the color of the target pixel is not a chromatic color, in short, is white or black, the CPU 11 proceeds to S305. When the color is a chromatic color, the CPU 11 decides that a line including a chromatic color was acquired, and then proceeds to S308. When it is decided that a line including a chromatic color was acquired in S304, the image data is confirmed to include a chromatic color.

In S305, the CPU 11 converts the target pixel into the single color K data. The following shows one example of a conversion equation for converting a target pixel into the single color K data.

$$C=0$$

$$M=0$$

$$Y=0$$

$$K=255-R(=255-G=255-B)$$

In S306, the CPU 11 adds 1 to the variable x and goes back to S301. In S307, the CPU 11 sets the color mode to the dual mode, then proceeds to S309. In S308, the CPU 11 sets the color mode to the CMYK mode, then proceeds to S309.

In S309, the CPU 11 discards the conversion result acquired by converting a line to be processed halfway into the single color K data. The conversion result acquired by the halfway conversion is discarded because, when "dual mode" or the "CMYK mode" is set, S313 in the FIG. 8 is not executed (in short, 1 is not added to the variable y), and, after returning to S202 (FIG. 7), "dual mode conversion" or "CMYK mode conversion" is restarted from the beginning to the same line. After S309, when the K mode conversion processing ended and the process went back to S202 (FIG. 7), the dual mode or the CMYK mode is set in S307 or S308, and thereafter the process proceeds to the dual mode conversion (S207) or the CMYK mode conversion (S208).

In S310, the CPU 11 compresses the single color K data for one line. In S311, the CPU 11 converts the single color K data for one line compressed in S310 into a command. In S312, the CPU 11 outputs the single color K data for one line converted into a command to the printer 2. In S313, the CPU 11 adds 1 to the variable y and ends the processing, then returns to the processing in S202 (FIG. 7). However, the color mode remains in the K mode, and the K mode conversion (S205) is provided also to the next line.

(3-3) Dual Mode Conversion

Figure 9:
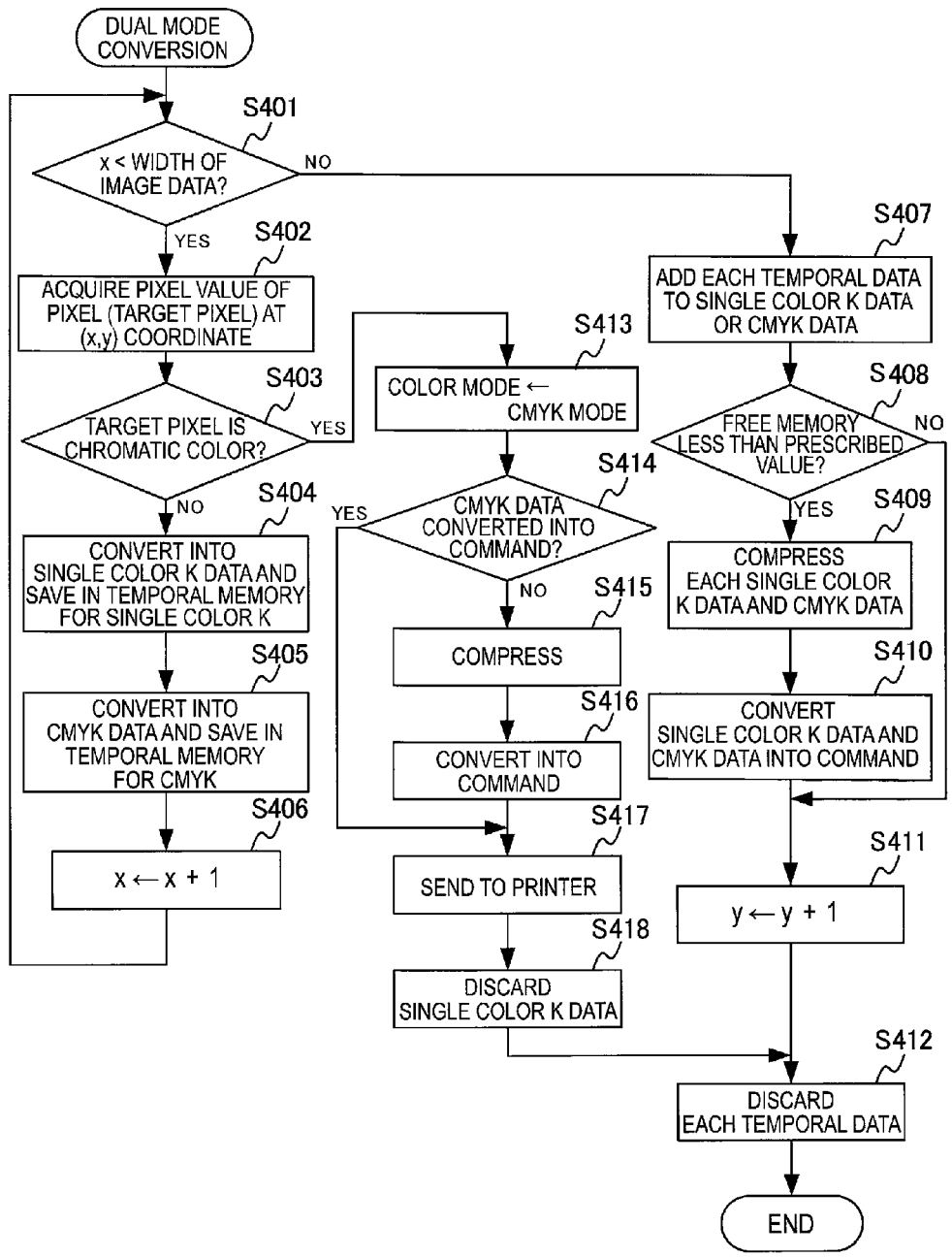
FIG. 9 is a flow chart showing a processing flow of dual mode conversion.

FIG. 9 is a flow chart showing a processing flow of the dual mode conversion. In S401, the CPU 11 decides whether the conversion for one line has completed or not. When the variable x is smaller than the width of the image, the CPU 11 decides that the conversion for one line has not yet completed and proceeds to S402. When the variable x is equal to the width of the image, the CPU 11 decides that the conversion has completed and proceeds to S407.

In S402, the CPU 11 acquires a pixel value (a value of each RGB element) of a pixel (target pixel) of the coordinate (variable x, variable y) from a line to be processed. In S403, the CPU 11 decides whether the color of the target pixel is a chromatic color or not, based on an acquired pixel value. When the color of the target pixel is not a chromatic color (is white, black, or gray), the CPU 11 proceeds to S404. When the color is a chromatic color, the CPU 11 decides that a line including a chromatic color was acquired, and proceeds to S413. When it is decided that a line including a chromatic color was acquired in S403, the image data is therefore decided as including a chromatic color.

In S404, the CPU 11 converts the target pixel into the single color K data and stores as temporal single color K data in a temporal memory for single color K. In the present aspect, the RAM 13 is used as the temporal memory for single color K.

In S405, the CPU 11 converts the target pixel into the CMYK data and stores as temporal CMYK data in a temporal memory for CMYK. In the present aspect, the RAM 13 is used as the temporal memory for CMYK. The following shows one example of a conversion equation for converting a target pixel into the CMYK data.

$$C=255-R-K$$

$$M=255-G-K$$

$$Y=255-B-K$$

$$K=\min(255-R,255-G,255-B)$$

In S406, the CPU 11 adds 1 to the variable x and goes back to S401. In S407, the CPU 11 adds the temporal single color K data for one line stored in the temporal memory for single color K to the single color K data stored in the RAM 13, and adds the temporal CMYK data for one line stored in the temporal memory for CMYK to the CMYK data stored in the RAM 13. At the first time of executing the dual mode, no single color K data and no CMYK data is stored yet in the RAM 13. So, the temporal single color K data and the temporal CMYK data is stored respectively as the single color K data and the CMYK data, and from the next time, is added respectively to these single color K data and the CMYK data.

In S408, the CPU 11 decides whether or not the free space of the RAM 13 is less than a predetermined value that has been previously set. If the free space of the RAM 13 is less than the predetermined value, the CPU 11 proceeds to S409, and if not, proceeds to S411. In S409, the CPU 11 compresses the single color K data and the CMYK data for one line added in S407.

In S410, the CPU 11 converts the single color K data and the CMYK data compressed in S409 into a command, and stores the command data in the RAM 13. In S411, the CPU 11 adds 1 to the variable y. In S412, the CPU 11 discards the temporal single color K data and the temporal CMYK data stored in the RAM 13 from the RAM 13. After that, the CPU 11 ends the dual mode conversion and returns to S202 (FIG. 7). In this case, the color mode remains in the dual mode, and the dual mode conversion (S207) is therefore provided also to the next line.

In a state of waiting to output the converted data in the dual mode, that has been set since a line including gray was decided to be acquired before a line including a chromatic color in S303 in FIG. 8, it was decided that a line including a chromatic color was acquired in S403 after starting to wait. In short, the image data was decided to include a chromatic color, and therefore, gray is decided to be expressed by the combination of densities of four colors CMYK. In response to the above, the processing in S413 to S418 collectively outputs the CMYK data among the single color K data and the CMYK data that has been converted and stored in the RAM 13 while waiting to output.

In S413, the CPU 11 sets the color mode to the CMYK mode. In S414, the CPU 11 decides whether or not the CMYK data that has not yet converted into a command is stored in the RAM 13. When the dual mode was in execution with respect to a line before the line to be processed, the CMYK data may be stored in the RAM 13 without being compressed and converted into a command in S409 and S410, since the free space of the RAM 13 is more than a prescribed value. Here, for converting the CMYK data, that has been stored in the RAM 13 without being converted into a command, into a command, the CPU 11 decides whether or not the CMYK data not yet converted into a command is stored in the RAM 13. If the CMYK data not yet converted into a command is stored, the CPU 11 proceeds to S415, and if not stored, proceeds to S417.

In S415, the CPU 11 compresses the CMYK data, that have not been converted into a command and stored in the RAM 13, respectively for each line. In S416, the CPU 11 converts the compressed CMYK data respectively into a command. In S417, the CPU 11 outputs all the CMYK data that has been converted into commands, in other words, all the CMYK data for which the output has been waited, to the printer 2. In S418, the CPU 11 discards all the single color K data stored in the RAM 13 and ends the processing. When the dual mode was in execution for a line before the line to be processed, the single color K data of the previous line is stored in the RAM 13. However, at the time of deciding that the image data includes a chromatic color (at the time when "Yes" was decided in S403), the single color K data is no more required, and the single color K data stored in the RAM 13 is therefore discarded.

(3-4) CMYK Mode Conversion

Figure 10:
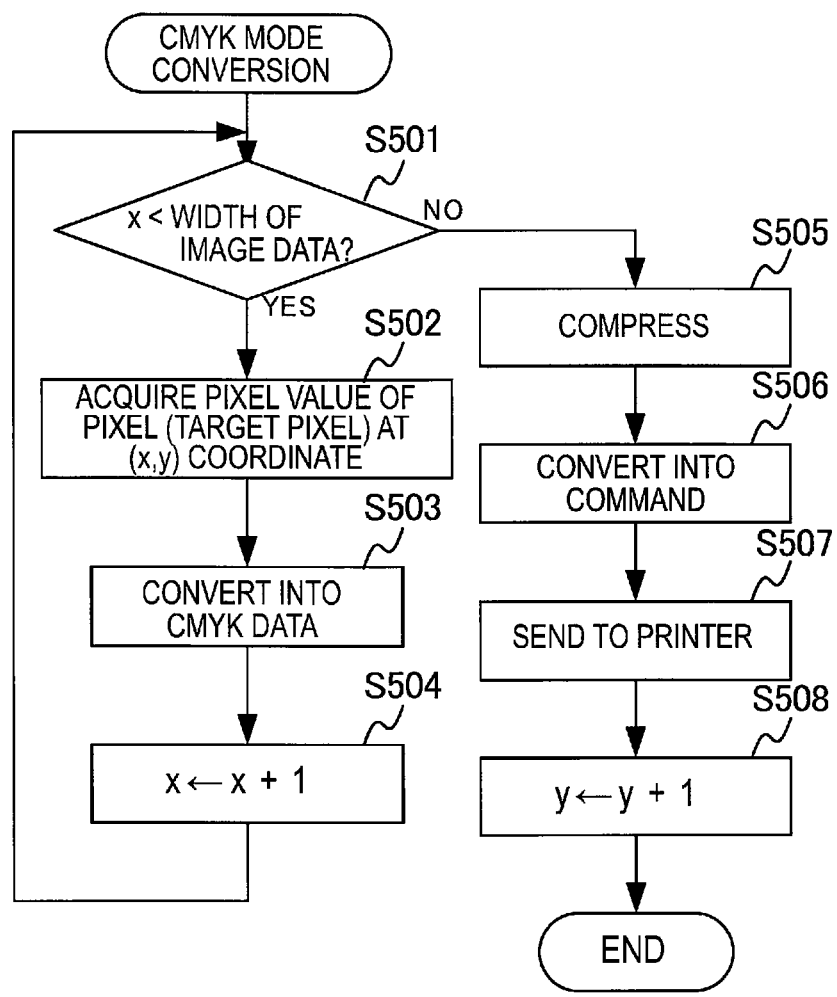
FIG. 10 is a flow chart showing a processing flow of CMYK mode conversion.

FIG. 10 is a flow chart showing a processing flow of the CMYK mode conversion. In S501, the CPU 11 decides whether the conversion for one line has completed or not. When the variable x is smaller than the width of the image, the CPU 11 decides that the conversion for one line has not yet completed, and proceeds to S502. When the variable x is equal to the width of the image, the CPU 11 decides that the conversion has completed, and proceeds to S505.

In S502, the CPU 11 acquires a pixel value of a pixel (target pixel) of the coordinate (variable x, variable y) from a line to be processed. In S503, the CPU 11 converts the target pixel into the CMYK data. In S504, the CPU 11 adds 1 to the variable x and goes back to S501. In S505, the CPU 11 compresses the converted CMYK data for one line.

In S506, the CPU 11 converts the CMYK data compressed in S505 into a command. In S507, the CPU 11 outputs the CMYK data converted into a command to the printer 2. In S508, the CPU 11 adds 1 to the variable y. After that, the CPU 11 ends the CMYK mode conversion and returns to S202 (FIG. 7). However, the color mode remains in the CMYK mode, and the CMYK mode conversion (S208) is therefore provided also to the next line. Thereafter, the CMYK mode conversion is performed until the acquisition of image data is ended.

(3-5) General Flow of Color Space Conversion Processing (Last Half)

Returning back to FIG. 7, the last half (S209 to S213) of the general flow of color space conversion processing is explained. The processing in S209 to S213 is executed when the color mode has been set in the dual mode. In a state that the color mode has been set in dual mode and the output of the converted data is waiting, and when image data acquisition is ended after starting to wait without acquiring a line including a chromatic color, the image data is decided not to include a chromatic color. Then gray is accordingly decided to be expressed by a density of the single color K, and the single color K data among the single color K data and the CMYK data, that has been converted and stored in the RAM 13 while waiting to output, is output collectively. However, even with the dual mode been set, if the color mode shifts to the CMYK mode thereafter, the single color K data stored in the RAM 13 while waiting is discarded in S418. In this case, the single color K data is not output even with the execution of the present processing.

In the above-mentioned dual mode conversion, the CMYK data is compressed and converted into a command when the color mode is set to the CMYK mode in S413, even without the same processing in S409 to S410. However, when the single color K data is not compressed and converted into a command in S409 to S410, the same processing is not provided to the single color K data during the dual mode conversion thereafter.

Therefore, when the image data acquisition is ended in the dual mode conversion without setting the CMYK mode, and when the single color K data stored in the RAM 13 is decided to be accordingly output in response, compression and converting into a command is required for the data in the single color K data stored in the RAM 13 that has not yet been compressed and converted into a command.

Here, in the last half of the color space conversion processing, the single color data that was not compressed and converted into a command in S409 to S410 of the dual mode conversion is compressed and converted into a command, so as to be output to the printer 2 along with the single color K data that has been compressed and converted into a command in S409 to S410.

In S209, the CPU 11 decides whether the color mode is in the dual mode or not. When the color mode is in the dual mode, the CPU 11 proceeds to S210. If the color mode is in the other mode, the CPU 11 ends the color space conversion processing and returns to S101 (FIG. 2). In S210, the CPU 11 decides whether or not there is the data, that has not yet compressed and converted into a command, in the single color K data stored in the RAM 13. When there is the data that has not compressed and converted into a command, the CPU 11 proceeds to S211, and if not, proceeds to S213.

In S211, the CPU 11 compresses the data in the single color K data stored in the RAM 13 that has not been compressed and converted into a command. In S212, the CPU 11 converts the single color K data compressed in S211 into a command. In S213, the CPU 11 outputs all the single color K data that has been converted into commands, in other words, all the single color K data for which the output has been waited, to the printer 2. And then, the CPU 11 ends the color space conversion processing and returns to S101 (FIG. 2).

(4) Effect of Aspect

According to the PC 1 in one aspect of the present invention, when a line including gray is acquired prior to a line including a chromatic color, whether gray should be expressed by a density of a single color black or by the combination of densities of multiple colors cannot be decided, and therefore the output is waited until whether a chromatic color is included or not is decided. However, the PC 1 outputs converted data without waiting the decision on whether or not a chromatic color is included in the image data with respect to the line acquired prior to the input of the line including gray. Therefore, the PC 1 can output converted data at an earlier stage, in comparison with the case of waiting to convert until the decision on whether a chromatic color is included in the image data or not is made.

For example, when the image data does not include a chromatic color and gray like document data showing letters in black (one example of image data), and when comparing the PC 1 with the conventional art in which the conversion is started after confirming the existence of a chromatic color, the conventional art needs to examine the image data till the last if the image data does not include a chromatic color, and therefore starts converting after examining the image data all the way. On the other hand, the PC 1 outputs converted data without waiting if the image data does not include gray. Therefore, when the image data was decided not to include a chromatic color as a result of examination all the way, the output of the converted data for most of the lines has finished. Accordingly, the PC 1 is able to start outputting the converted data considerably more quickly compared with the conventional art, particularly when the image data does not include gray and a chromatic color. In addition, image data to be printed by a printer is generally presumed to be mostly a document, and in many cases, the PC 1 can output the converted data considerably more quickly than the conventional art.

Additionally, the PC 1 does not examine the presence of a chromatic color close to the concerned pixel, and thus the processing amount can be reduced, in comparison with the case where whether gray is expressed by the combination of densities of four colors CMYK or by a density of the single color K is decided according to whether a chromatic color is present close to the concerned pixel or not. This allows the converted data to be output in an earlier stage.

Moreover, when a line including gray is acquired before the acquisition of a line including a chromatic color, it cannot be decided whether the CMYK data or the single color K data should be output, and the PC 1 therefore shifts to the dual mode and waits the output. However, in the dual mode, an acquired line is converted into both the single color K data and the CMYK data and stored in the RAM 13. Regarding the line for which the output of the converted data has been waited, the converted data can therefore be output in an earlier stage, in comparison with the case to start the conversion into the CMYK data after the input of the line including a chromatic color, or with the case to start the conversion into the single color K data after ending the acquisition of image data.

Furthermore, when converting into the converted data of both the single color K data and the CMYK data, the PC 1 discards one of the converted single color K data or the converted CMYK data stored in the RAM 13 which was not output, and thereby reducing the using space of the RAM 13.

Moreover, when converting into the converted data of both the single color K data and the CMYK data, the PC 1 stores the converted data in the RAM 13 without compression if the free space of the RAM 13 is greater than or equal to a prescribed value. In a state of converting an acquired line into both the single color black data and the CMYK data (dual mode), it is unclear which type of converted data is to be output consequently. The PC 1 stores the converted data without compression when the free space of the RAM 13 is greater than or equal to a prescribed value, and thereby omitting unnecessary compression processing. On the other hand, the PC 1 can reduce the using space of the RAM 13 by compressing the converted data when the free space of the RAM 13 is less than a prescribed value. In addition, if the free space of the RAM 13 is less than a prescribed value, data compression may be performed before converting the data into a command. Accordingly, the size of the converted data can be further reduced, and thereby enhancing the effect of reducing the using space of the RAM 13.

Furthermore, before acquiring a line including a chromatic color or gray, and when an acquired line does not include neither a chromatic color nor gray (in short, white, black, or a line constituted by both colors), the PC 1 outputs data without waiting, and thus can start the output of the converted data in an earlier stage.

<Other Aspects>

The present invention is not limited to the aspects described in the above with reference to the accompanying figures, and, for example, the following can also be included in the technical scope of the present invention.

(1) In the above aspect, when a line including gray is acquired before a line including a chromatic color (partial data) is acquired, the output of the converted data is waited, and the acquired line is converted into both the single color K data and the CMYK data, as one example. However, when a line including gray was acquired, the conversion thereafter may wait until a line including a chromatic color is acquired or the end of the acquisition of image data, and then the conversion of these lines waiting to be processed into the CMYK color space may start for the first since the acquisition of a line including a chromatic color or the end of the acquisition of image data.

(2) In the above aspect, the PC 1 is described as an image processing device, however, the image processing device may be a printer. In this case, the PC 1 may execute the processing, for example, till the drawing processing then outputs to the printer, and the printer thereafter may execute from the color space conversion processing to the printing. Or, the printer may execute also the drawing processing. Additionally, the image processing device may be a printer having a so-called direct printing function for directly reading an image from a detachable nonvolatile storage medium, such as, for example, an USB memory, and printing. In this case, the printer executes also the drawing processing.

(3) In the above aspect, image data for one line is regarded as one partial data, however, multiple lines such as two lines or three lines may be regarded as one partial data. Moreover, one pixel of image data may be one partial data. In addition, the present aspect was explained as an example where every acquired line is converted and output at each time at least after the acquisition of a line including a chromatic color. However, collective conversion may be performed after multiple partial data was acquired, or collective output may be performed after waiting for the completion of conversion of multiple lines.

(4) The above aspect was explained as an example where the image data is converted into a CMYK color space, however, this is because the printer uses the toners of four colors CMYK. What kind of color space the data should be converted into may be appropriately decided in accordance with the number of toner colors used by the printer for printing. A color space of image data to be input may also be appropriately decided.

What is claimed is:

1. An image processing device comprising:
a processor;
a storage device; and
a memory storing computer executable instructions that, when executed by the processor, cause the image processing device to:
sequentially acquire at least two pieces of image data as partial image data;
determine if a first piece of image data of the at least two pieces of image data includes a gray object;
convert the first piece of image data into both first multi-color data and single color black data responsive to determining that the first piece of image data includes the gray object, the first multi-color data expressing the gray object by a combination of densities of multi-colors, the single color black data expressing the gray object by a single color black;
store both the first multi-color data and the single color black data in the storage device;
determine if a second piece of image data acquired after the first piece of image data includes a chromatic color object;
output the first multi-color data for the first piece of image data including the gray object from the storage device responsive to determining that the second piece of image data acquired after the first piece of image data including the gray object includes the chromatic color object;

convert any piece of image data acquired after the second piece of image data including the chromatic color object into second multi-color data, the second multi-color data expressing any object by a combination of densities of multiple colors;

output the second multi-color data; and output the single color black data for the first piece of image data including the gray object from the storage device responsive to the sequential acquisition of the at least two pieces of image data being completed without acquiring any piece of image data including the chromatic color object.

2. The image processing device according to claim 1, wherein the memory stores additional computer executable instructions that, when executed by the processor, further cause the image processing device to discard the single color black data responsive to determining that the second piece of image data acquired after the first piece of image data including the gray object includes the chromatic color object.

3. The image processing device according to claim 1, wherein the memory stores additional computer executable instructions that, when executed by the processor, further cause the image processing device to:

determine an amount of a free space of the storage device before storing the single color black data and the first multi-color data in the storage device;

compress the single color black data and the first multi-color data when the amount of the free space is less than a prescribed value; and store the compressed single color black data and the compressed first multi-color data in the storage device.

4. The image processing device according to claim 1, wherein the memory stores additional computer executable instructions that, when executed by the processor, further cause the image processing device to:

before acquiring the first piece of image data including the gray object and the second piece of image data including the chromatic color object, convert one or more acquired pieces of image data into another single color black data to express the one or more acquired pieces of image data by the single color black; and output the other singe color black data.

5. A non-transitory computer readable medium having computer-readable instructions stored thereon that, when executed, causes a processor to:

sequentially acquire at least two pieces of image data as partial image data;

determine if a first piece of image data of the at least two pieces of image data includes a gray object;

convert the first piece of image data into both first multi-color data and single color black data responsive to determining that the first piece of image data includes the gray object, the first multi-color data expressing the gray object by a combination of densities of multi-colors, the single color black data expressing the gray object by a single color black;

store both the first multi-color data and the single color black data in a storage device;

determine if a second piece of image data acquired after the first piece of image data includes a chromatic color object;

output the first multi-color data for the first piece of image data including the gray object from the storage device responsive to determining that the second piece of image data acquired after the first piece of image data including the gray object includes the chromatic color object;

convert any piece of image data acquired after the second piece of image data including the chromatic color object into second multi-color data, the second multi-color data expressing any object by a combination of densities of multiple colors;

output the second multi-color data; and output the single color black data for the first piece of image data including the gray object from the storage device responsive to the sequential acquisition of the at least two pieces of image data being completed without acquiring any piece of image data including the chromatic color object.

6. A method, comprising:

sequentially acquiring at least two pieces of image data as partial image data;

determining if a first piece of image data of the at least two pieces of image data includes a gray object;

converting the first piece of image data into both first multi-color data and single color black data responsive to determining that the first piece of image data includes the gray object, the first multi-color data expressing the gray object by a combination of densities of multi-colors, the single color black data expressing the gray object by a single color black;

storing both the first multi-color data and the single color black data in a storage device;

determining if a second piece of image data acquired after the first piece of image data includes a chromatic color object;

outputting the first multi-color data for the first piece of image data including the gray object from the storage device responsive to determining that the second piece of image data acquired after the first piece of image data including the gray object includes the chromatic color object;

converting any piece of image data acquired after the second piece of image data including the chromatic color object into second multi-color data, the second multi-color data expressing any object by a combination of densities of multiple colors;

outputting the second multi-color data; and outputting the single color black data for the first piece of image data including the gray object from the storage device responsive to the sequential acquisition of the at least two pieces of image data being completed without acquiring any piece of image data including the chromatic color object.

7. The image processing device according to claim 1, wherein the memory stores additional computer executable instructions that, when executed by the processor, further cause the image processing device to discard the first multi-color data when the acquisition of the image data is completed without acquiring any piece of image data including the chromatic color object.

8. The image processing device according to claim 4, wherein the memory stores additional computer executable instructions that, when executed by the processor, further cause the image processing device to:

convert the first piece of image data including the gray object into both the first multi-color data and the single color black data when determining that the first piece of image data includes the gray object; and store both the first multi-color data and the single color black data for the first piece of image data in the storage device.

9. The image processing device according to claim 1, wherein the memory stores additional computer executable instructions that, when executed by the processor, further cause the image processing device to discard the single color black data when determining that the second piece of image data acquired after the piece of image data including the gray object includes the chromatic color object.

10. The image processing device according to claim 1, wherein the first piece of image data is converted into both the first multi-color data and the single color black data during the sequential acquisition of the at least two pieces of image data when any piece of the at least two pieces of image data includes a gray object.

\* \* \* \* \*